Figure 1:
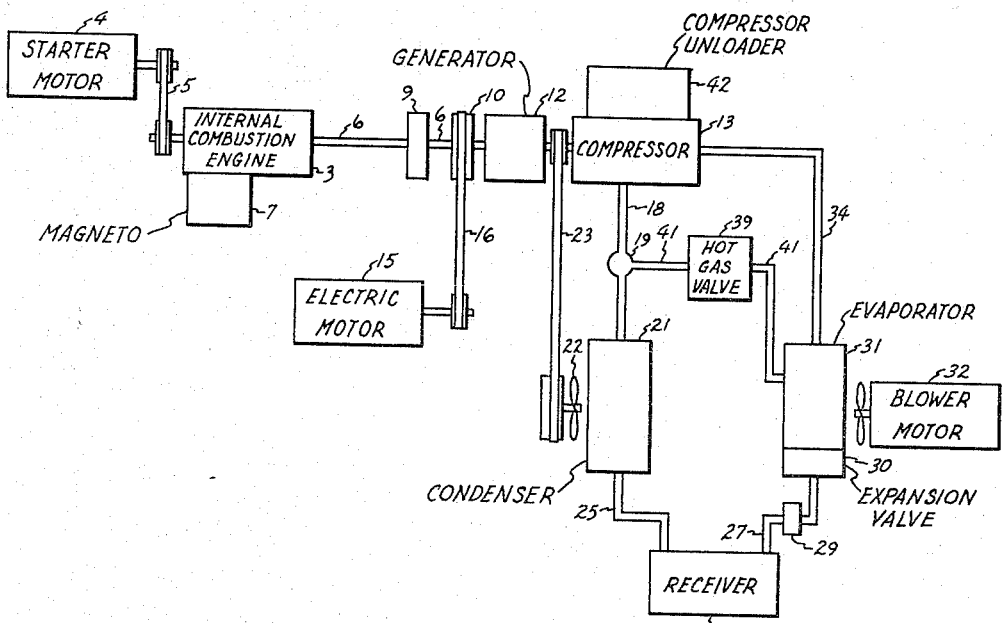

Dec. 6, 1960     J. L. ANDERSON     2,962,873
REFRIGERATION SYSTEM

Filed March 30, 1959     2 Sheets-Sheet 1

INVENTOR.
JOHN L. ANDERSON
BY George H. Baldwin
ATTORNEY

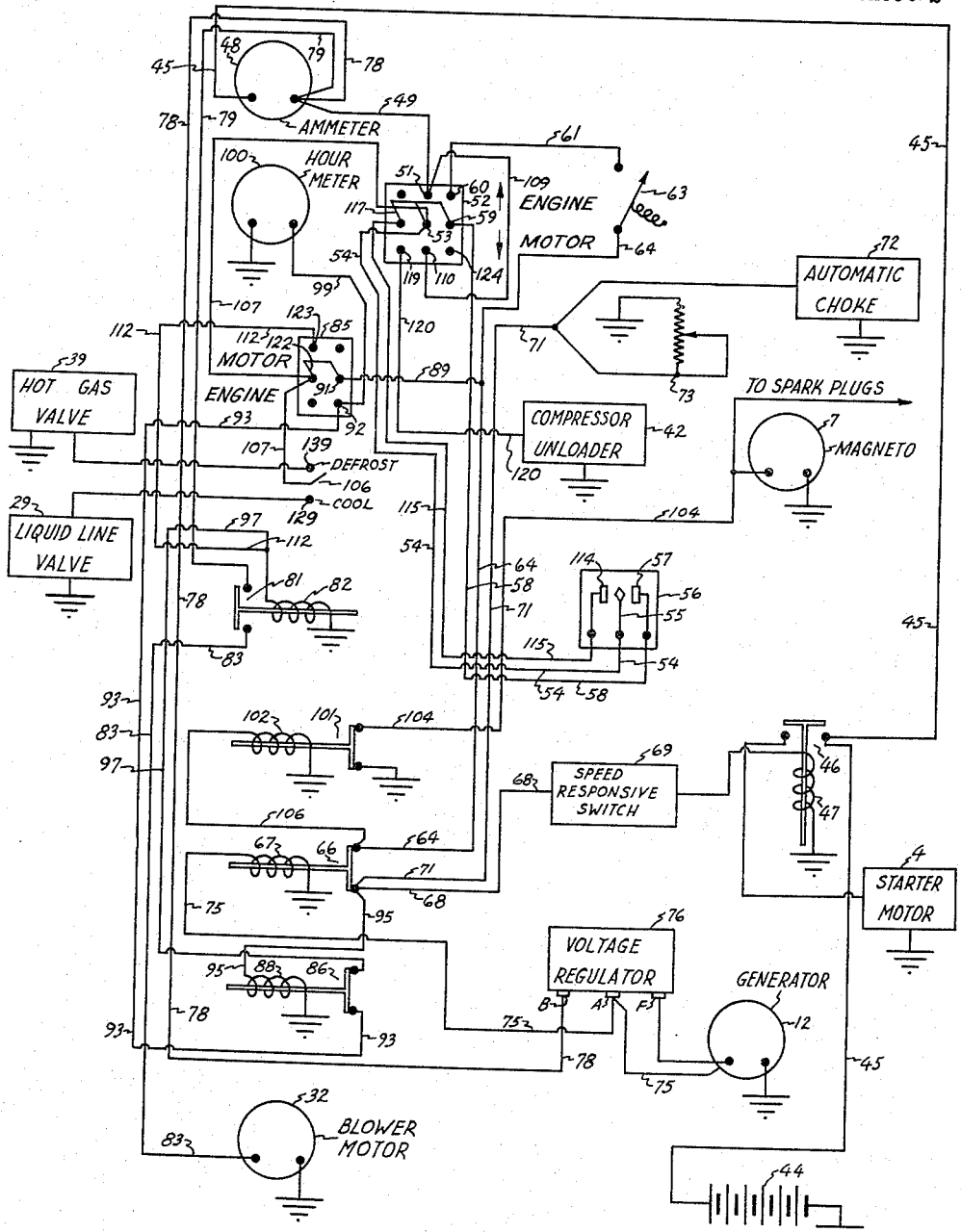

United States Patent Office 2,962,873
Patented Dec. 6, 1960

2,962,873

REFRIGERATION SYSTEM

John L. Anderson, Jacksonville, Fla., assignor to Polar Bear, Inc., Jacksonville, Fla., a corporation of Florida Filed Mar. 30, 1959, Ser. No. 802,679

4 Claims. (Cl. 62—180)

The present invention relates to a refrigeration system particularly adapted for use with trucks within which are carried frozen foods and the like.

Perishables such as meats, vegetables, fruits, and fruit juices are transported over long distances in trucks that are artificially cooled to preserve the cargoes. The present invention is an improved system for providing this refrigeration.

Accordingly, an object of the present invention is to provide an improved refrigeration system.

Another object is to provide refrigeration economically with alternate sources of power.

A further object of the present invention is to provide an incomplex and efficient control system for a refrigeration system.

These and other objects are achieved in a preferred embodiment of my invention in which the compressor for the refrigeration system is driven under full load by an internal combustion engine on a start-stop basis depending upon the temperature of the refrigerated compartment. Alternatively, the compressor is driven constantly by an electrical motor and the compressor load is controlled as a function of the temperature of the refrigerated compartment.

The novel features believed characteristic of the invention are set forth in the appended claims. The invention itself, however, together with further objects and advantages thereof, may best be understood by reference to the following description taken in connection with the accompanying drawings, in which:

Fig. 1 is a diagrammatic illustration of a preferred refrigeration system embodiment of the present invention, and Fig. 2 is a circuit diagram of a preferred control system embodiment of the present invention.

Referring now to the refrigeration system embodiment of Fig. 1, an internal combustion engine 3, which is started by an electrical starter motor 4 through a driving arrangement 5, drives a shaft 6 and a magneto 7. Shaft 6 is connected through two clutches 9 and 10 to a direct current generator 12 and a compressor 13 such that when engine 3 is operating it drives back generator 12 and compressor 13. Alternatively, these two units may be driven by an electrical motor 15 that is connected to shaft 6 through a driving arrangement 16 and clutch 10.

When engine 3 is operating, clutch 10, which is of the overrunning type, disconnects motor 15 from shaft 6. However, in some applications it may be desired to eliminate clutch 10 and thus permit engine 3 to drive motor 15 since the latter presents only a small frictional load. When motor 15 is operating, clutch 9 disconnects engine 3.

The illustrated refrigeration unit includes a compressor 13 for compressing the gas refrigerant which then flows through a conduit 18, past a T connection 19 to a condenser 21 that is cooled by a fan 22 connected through a driving arrangement 23 to shaft 6. The refrigerant, which is liquefied in condenser 21, flows from condenser 21 through a conduit 25 to a receiver 26.

The liquid refrigerant from receiver 26 flows through a conduit 27 and an electrically actuated liquid line valve 29 to an expansion valve 30 positioned at an end of evaporator 31. Expansion valve 30 may be of the thermostatic type for controlling the rate of refrigerant flow into evaporator 31. As the refrigerant evaporates and expands, it absorbs heat, thus causing the walls of evaporator 31 to become cold. The air in the refrigerated compartment is blown through the evaporator coils by a blower arrangement 32.

The refrigerant gas from evaporator 31 flows through a conduit 34 to the low pressure side of compressor 13.

During defrosting operations, valve 29 is closed and another electrically actuated valve 39 opened to permit the hot compressed gas from compressor 13 to flow through a conduit 41 connected between T connection 19 and an intermediate point in evaporator 31. The resulting flow of hot gases in the evaporator coils produces the desired defrosting.

As will be explained later, there are times when it is desired to unload compressor 13. Accordingly, an electrically actuated compressor unloader 42, which may be conventional, is provided. Unloader 42 may, for example, comprise solenoid operated valves in the cylinder walls that when opened prevent compressor 13 from compressing the refrigerant gas.

Referring now to Fig. 2, there is illustrated a preferred system for controlling the operation of the components of the Fig. 1 embodiment. This control system comprises a direct current battery 44 which is preferably separate from and additional to the engine battery for the truck in which this refrigeration system is mounted. One terminal of battery 44 is grounded while the other is connected by a lead 45 to one terminal of a normally-open starter relay 46, the other terminal of which is connected to starter motor 4. Thus, relay 46, which has a solenoid 47, controls the current flow from battery 44 to starter motor 4.

Lead 45 continues from relay 46 to one terminal of an ammeter 48, the other terminal of which is connected by a lead 49 to a terminal 51 of a three pole-double throw switch 52. If the armature of switch 52 is thrown to the position marked "engine," the terminal 51 is connected to armature terminal 53 and the battery 44 is connected by a lead 54 to the armature 55 of a thermostatic switch 56 mounted in the refrigerated compartment. When the temperature of this compartment rises above a predetermined temperature that is lower than the danger temperature by a safety margin, armature 55 moves to the right to touch a terminal 57. This terminal 57 is connected by a lead 58 to another armature terminal 59 of switch 52. With the armature of switch 52 in the "engine" position, terminal 59 is connected through its armature to a terminal 60 that is joined by a lead 61 to one terminal of a current responsive switch 63. Switch 63 automatically opens when a certain current flows through it for a certain length of time, and may, for example, have a bimetallic spring that when sufficiently heated by the current flow, causes the armature of switch 63 to open. Also, after it has been opened, switch 63 must be closed manually; i.e. it does not close automatically.

When switch 63 is closed, current flows through a lead 64 to a terminal of a normally-closed starter lockout relay 66, which has a solenoid 67. If this relay is closed, the current from battery 44 flows through a lead 68 and a speed responsive switch 69 to solenoid 47, thereby causing relay 46 to close and, as a consequence, the starter motor 4 to be energized by current from battery 44. The speed responsive switch 69 is preferably governor controlled.

To summarize the above-explained detailed operation, if the gasoline engine 3 is utilized as the driver, the armature of switch 52 should be thrown to the "engine" position. Then when the temperature in the refrigerated compartment rises too high, the thermostatic switch 56 closes to complete a circuit from battery 44 to solenoid 47 of relay 46. The energized relay 46 then closes to complete a circuit from battery 44 to starter motor 4.

The speed responsive switch 69 functions, upon engine 3 reaching operating speed, to open the battery circuit to solenoid 47, thus causing the started motor 4 to be deenergized. Switch 69 may, for example, be a centrifugal-type switch connected to shaft 6 that opens when shaft 6 reaches an angular speed indicative of engine 3 having started. However, it is preferred that switch 69 be operated by the governor (not shown) for engine 3. Then when the engine 3 starts, and the governor begins to close the throttle down to the desired operating speed, the governor, at the same time, also opens switch 69.

At the start of operation, current from battery 44 also flows from relay 66 through a lead 71 to an electrically actuated automatic choke 72 for engine 3 and also to a grounded variable resistor 73. The setting of resistor 73, which controls the current flow through current responsive switch 63, is adjusted such that if the engine 3 does not start in a reasonable time—for example, 15 or 20 seconds—the current flow through switch 63 is of sufficient magnitude to cause it to open. Then after the engine trouble has been corrected, switch 63 can be closed and the starting operation repeated. The automatic opening of switch 63 prevents the excessive current drain from battery 44 that would otherwise occur when there was engine failure.

When engine 3 starts, it drives generator 12 which then produces a current flow through a lead 75 to the ammeter terminal of a voltage regulator 76 and from there to the solenoid 67 of relay 66. The energized solenoid 67 opens relay 66 and, as a consequence, the automatic choke 72 is deenergized. If generator 12 fails to produce voltage sufficient to operate relay 66 after the engine starts, such as if the generator is burned out, centrifugal switch 69 is nevertheless opened to disconnect the starter as the engine starts.

The battery terminal of voltage regulator 76 is connected by a lead 78 to a terminal of ammeter 48. Thus, when generator 12 is producing current, some of this current flows through voltage regulator 76 and through leads 78 and 45 to charge battery 44.

The blower motor 32 is not energized until after engine 3 has started, for the load on battery 44 would be excessive if blower motor 32 were energized while starter motor 4 is drawing current. Thus, a circuit is provided for delaying this energization. In this circuit, a lead 79, connected to a terminal of ammeter 48, conducts current to a terminal of a normally-open blower motor relay 81 having a solenoid 82. When relay 81 is closed, this current flows through a lead 83 to blower motor 32.

The energization of the solenoid 82 of relay 81 is controlled by a double pole-double throw switch 85 and a normally-closed relay 86 which has a solenoid 88. In this energized circuit a lead 89 conducts current from wire 64 to an armature terminal 91 of switch 85. When the armature of switch 85 is thrown to the position marked "engine," terminal 91 is connected through its armature to a terminal 92 and this current is conducted by a lead 93 to a terminal of relay 86. During the starting operation, this current is blocked at relay 86, which is then open, and thus the blower motor 32 is not energized. Since the solenoid 88 of relay 86 is connected by a lead 95 to a terminal of relay 66, relay 86 remains open when relay 66 is closed, and the blower motor 32 is not energized. But when engine 3 starts, relay 66 opens, as previously mentioned, and as a consequence solenoid 88 is deenergized. Then relay 86 closes thereby completing an energizing circuit through a lead 97 to solenoid 82 of relay 81. The energized relay 81 closes, thereby completing the energizing circuit for blower motor 32.

Another circuit is connected to terminal 92 of switch 85. This circuit comprises a lead 99 connected between terminal 92 and an hour meter 100. As long as the armature of switch 52 and 85 are in the "engine" position, switch 63 is closed, and the armature 55 of switch 56 is against terminal 57, the hour meter 100 is energized. Meter 100 thus provides an indication of the total time that engine 3 is operated.

When the refrigerated compartment cools to the desired temperature, the engine 3 should be stopped. The circuit for providing this function includes a normally-closed relay 101 with solenoid 102. One of the terminals of relay 101 is grounded and the other one is connected by a lead 104 to the ungrounded terminal of magneto 7. Thus, when relay 101 closes, the magneto 7 is grounded, which grounding causes engine 3 to stop.

The solenoid 102 of relay 101 is connected by a lead 106 to a lead 64. Thus, as long as the elements 55 and 57 thermostatic switch 56 are in contact and the current responsive switch 63 is closed, and the armature of switch 52 is in the "engine" position, solenoid 102 is energized and relay 101 remains open. But when the thermostatic switch armature 55 swings away from contact 57, which occurs when the refrigerated compartment has sufficiently cooled, solenoid 102 is deenergized. Then relay 101 closes, thereby grounding magneto 7.

The refrigeration unit either cools or defrosts depending upon the position of a single pole-double throw cool-defrost selector switch 106. The armature of switch 106 is connected by a lead 107 to terminal 53 of switch 52 and thus is energized whenever the armature of switch 52 is thrown into the "engine" position. When the armature of switch 106 is thrown to the position marked "cool" connecting with terminal 129, the normally-closed liquid line valve 29 is energized and opens to permit the flow of refrigerant liquid to the expansion valve 30. However, when this armature is thrown to the "defrost" position in contact with terminal 139, the normally-closed hot gas valve 39 is energized and opens thereby allowing the hot compressed gas from the compressor 13 to flow to the evaporator 31 for defrosting it.

The foregoing discussion has been directed to the circuit elements utilized when the engine 3 drives compressor 13. Engine 3 usually will be used only when the refrigerated truck is moving. At other times it will usually be preferred that electrical motor 15 be used, if there is available a source of electrical energy.

When motor 15 is used as the driving force, the armatures of switches 52 and 85 should be thrown to the positions marked "motor."

In one of the "motor" circuits a lead 109 is connected between terminal 51 of switch 52 and a terminal 110. Since terminal 51 is connected to voltage regulator 76 through leads 49 and 78, current from generator 12, which is being constantly driven by motor 15, is conducted through leads 78, 49, and 109 to terminal 110 and thence through the armature of switch 52 to armature terminal 53 and thus to lead 107. Lead 107 then conducts this current to the center terminal of blower motor control switch 85. With the armature of switch 85 in the "motor" position, this current is conducted through armature 122 to terminal 123 and thus to a lead 112 that is connected to the solenoid 82 of the normally-open blower motor relay 81. Thus, relay 81 is energized to the closed position, thereby completing the circuit from generator 12 to the blower motor 32. Consequently, blower motor 32 is constantly energized when motor 15 provides the driving power for the refrigeration system.

When motor 15 is the driving power, compressor 13 is constantly driven. Thus, if it were always loaded, it would cause the refrigerated compartment to become too cold. To avoid this, a circuit is provided for unloading compressor 13 whenever the temperature of the refrigerated compartment drops to the desired maximum low magnitude. The thermostatic switch 56 is in this circuit. Whenever this low temperature is reached, armature 55 closes against a terminal 114. This closing completes a circuit for current flow from terminal 53 of switch 52, through lead 54 and armature 55 and terminal 114, and through a lead 115 connected between terminal 114 and the left armature 117 of switch 52. The current then flows through the left armature 117 of switch 52 to switch terminal 119 and from there through a lead 120 to compressor unloader 42. This current energizes unloader 42 causing it to unload compressor 13, and thus the refrigeration cycle to terminate. When the temperature of the refrigerated compartment rises several degrees above the maximum desired low temperature, armature 55 separates from terminal 114, the circuit to unloader 42 is opened, and thus the compressor 13 is again loaded.

During operation by motor 15, the starter relay 46 is always deenergized since with the armature of switch 52 in the "motor" position armature terminal 59 is connected through its armature to a blank terminal 124 and terminal 60 is open, whereby leads 64 and 68 are deenergized. For the same reason, lead 71 is deenergized and there is no current flow to resistor 73 and to the automatic choke 72.

When motor 15 is running, clutch 9 prevents the engine 3 and thus the magneto 7 from being driven. Therefore, engine 3 will not be started. In addition, magneto 7 will be grounded through the then closed relay 101.

The cool and defrost operations are exactly the same regardless of whether engine 3 or motor 15 is driving the refrigeration system. The armature of the cool-defrost selector switch 106 is connected by lead 107 to terminal 53 of switch 52, which terminal is energized through its armature regardless of whether the armature is thrown to the "engine" or "motor" position by connection thereof to terminal 51 or terminal 110, respectively.

The generator 12 provides current for the blower motor 32, for the relays, and for charging battery 44 whether engine 3 or motor 15 provides the driving power. Thus, current drain on battery 44 occurs only in the starting of engine 3, and battery 44 has a long operating life. Also, since generator 12 is driven when motor 15 is operated, there is no need of transformers and rectifiers to produce direct current for the relays and blower motor when motor 15 is running, as is the case with prior alternate power refrigeration systems.

It should be noted that engine 3 is operated on a start-stop cycle with the compressor 13 under full load. The cost of operating engine 3 constantly is usually prohibitive. However, the less expensive-to-operate motor 15 can be run constantly and the compressor load controlled in accordance with the temperature in the refrigerated compartment. This latter arrangement avoids the costly and complex circuits required to operate motor 15, and thus also blower motor 32, on a start-stop cycle.

When the armature of switch 52 is moved to a center position the control circuits are deenergized. However, generator 12 remains connected to battery 44. Thus, if generator 12 is being driven, it charges battery 44.

While the invention has been described with respect to certain specific embodiments, it will be appreciated that many modifications and changes may be made by those skilled in the art without departing from the spirit of the invention. I intend, therefore, by the appended claims to cover all such modifications and changes as fall within the true spirit and scope of the invention.

What I claim as new and desire to secure by Letters Patent of the United States is:

1. In a refrigeration system for refrigerating a compartment, the combination of a refrigeration unit including a compressor, a gasoline engine for actuating said compressor, an electrical motor for actuating said compressor independently of said engine, a direct current generator connected to be actuated with said compressor, an electrical starter motor for starting said gasoline engine, a direct current battery, a thermostatic switch for mounting in said compartment, said thermostatic switch having an armature that when the temperature in said compartment rises above a first predetermined temperature closes against a first terminal and that when this temperature drops below a second predetermined temperature lower than said first predetermined temperature closes against a second terminal, a first circuit including a first normally-open relay connected between said battery and said starter motor whereby said starter motor is energized when said first relay is closed, a second circuit including a first switch and said armature and said first terminal of said thermostatic switch for completing a circuit from said battery to energize said first relay when said armature closes against said first terminal whereby said starter motor is energized, means for automatically opening said second circuit when said engine starts operating, a blower motor, a third circuit including a second normally-open relay for conducting current from said generator to said blower motor, and means responsive to the current output of said generator for energizing said second relay whereby said third circuit is completed.

2. The refrigeration system as defined in claim 1 and a fourth circuit including a second switch for connecting said generator to energize said second relay whereby said blower motor is energized when said second switch is closed and said generator is operating, electrically actuated means for unloading said compressor, and a fifth circuit including a third switch and said armature and said second terminal of said thermostatic switch for completing a circuit from said generator to said electrically actuated means when said armature closes against said second terminal in said thermostatic switch whereby said electrically actuated means unloads said compressor.

3. A system for refrigerating a compartment, comprising in combination a compressor, a gasoline engine for driving said compressor, an electrical starter motor for starting said engine, a direct current generator connected to be driven by said engine, a direct current battery, a first normally-open relay having a solenoid, leads connecting said first relay in a first circuit between said battery and said starter motor whereby when said first relay is closed said first circuit is completed between said battery and said starter motor, a current responsive switch for opening after a predetermined current flow through said switch, a second normally-closed relay with a solenoid, a thermostatic switch for mounting in said compartment, a speed responsive switch for opening in response to the starting of said engine, leads for connecting said current responsive switch, said second relay, said thermostatic switch and said speed responsive switch in a second series circuit between said battery and said solenoid of said first relay whereby when said thermostatic switch closes said second circuit is completed between said battery and said solenoid of said first relay, and leads connecting the solenoid of said second relay to said generator whereby said solenoid of said second relay is energized when said generator develops a voltage output.

4. The system as defined in claim 3 and a blower motor, a third normally-open relay with a solenoid, leads connecting said third relay in a third series circuit between said generator and said blower motor whereby when said solenoid of said third relay is energized said third relay closes to complete said third circuit between said generator and said blower motor, a fourth normally-closed relay with a solenoid, leads for connecting the solenoid of said fourth relay in circuit with said second relay whereby said second relay controls the energization from said battery of said solenoid of said fourth battery, and leads for connecting said fourth relay in a series circuit with said solenoid of said third relay and said generator whereby when said solenoid of said fourth relay is deenergized, said fourth relay closes to complete a circuit between said generator and the solenoid of said third relay.

References Cited in the file of this patent

UNITED STATES PATENTS

| | | |
|---|---|---|
| 2,251,376 | Ross | Aug. 5, 1941 |
| 2,286,316 | Snook | June 16, 1942 |
| 2,286,961 | Hanson | June 16, 1942 |
| 2,311,622 | Alexander et al. | Feb. 23, 1943 |